United States Patent
Goel et al.

(10) Patent No.: US 10,256,593 B2
(45) Date of Patent: Apr. 9, 2019

(54) RAMAN AMPLIFIER PUMPED WITH RESIDUAL POWER IN AN OPTICAL COMMUNICATION SYSTEM

(71) Applicant: Facebook, Inc., Menlo Park, CA (US)

(72) Inventors: Nitin Kumar Goel, Mountain View, CA (US); Satyajeet Singh Ahuja, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/607,113

(22) Filed: May 26, 2017

(65) Prior Publication Data

US 2018/0342846 A1 Nov. 29, 2018

(51) Int. Cl.
| | |
|---|---|
| *H01S 3/063* | (2006.01) |
| *H01S 3/091* | (2006.01) |
| *H04B 10/291* | (2013.01) |
| *H04B 10/293* | (2013.01) |
| *H01S 3/067* | (2006.01) |
| *H01S 3/30* | (2006.01) |
| *H01S 3/10* | (2006.01) |

(52) U.S. Cl.
CPC ........ *H01S 3/06754* (2013.01); *H01S 3/0672* (2013.01); *H01S 3/091* (2013.01); *H01S 3/10007* (2013.01); *H01S 3/302* (2013.01); *H04B 10/2916* (2013.01); *H04B 10/2937* (2013.01)

(58) Field of Classification Search
None
See application file for complete search history.

(56) References Cited

U.S. PATENT DOCUMENTS

| | | |
|---|---|---|
| 2005/0195968 A1 | 9/2005 | Park |
| 2006/0256712 A1 | 11/2006 | Imajuku |
| 2010/0209117 A1* | 8/2010 | Chang ............... H01S 3/094061 398/175 |
| 2014/0161449 A1 | 6/2014 | Doerr et al. |

OTHER PUBLICATIONS

Non-Final Office Action dated Dec. 29, 2017 for U.S. Appl. No. 15/375,021 by Goel, N., et al., filed Dec. 9, 2016.
U.S. Appl. No. 15/681,292 by Goel, N. et al., filed Aug. 18, 2017.
U.S. Appl. No. 15/375,021 by Goel, N., et al., filed Dec. 9, 2016.
U.S. Appl. No. 15/647,191 by Goel, N. et al., filed Jul. 11, 2017.

\* cited by examiner

*Primary Examiner* — Michelle R Connelly
(74) *Attorney, Agent, or Firm* — Van Pelt, Yi & James LLP

(57) ABSTRACT

Aspects of an optical communications network are described that include two or more optical fibers arranged to allow communication in the same or in opposite directions. The optical network includes a first optical amplifier coupled to the first optical fiber, a second optical amplifier coupled to the second optical fiber, and an optical coupler that allows excess optical power from the first optical fiber to be provided for amplification of signals traversing the second optical fiber. The disclosed systems and devices thus enable excess power from one channel to be utilized to enable amplification of signals traveling on a different channel.

13 Claims, 4 Drawing Sheets

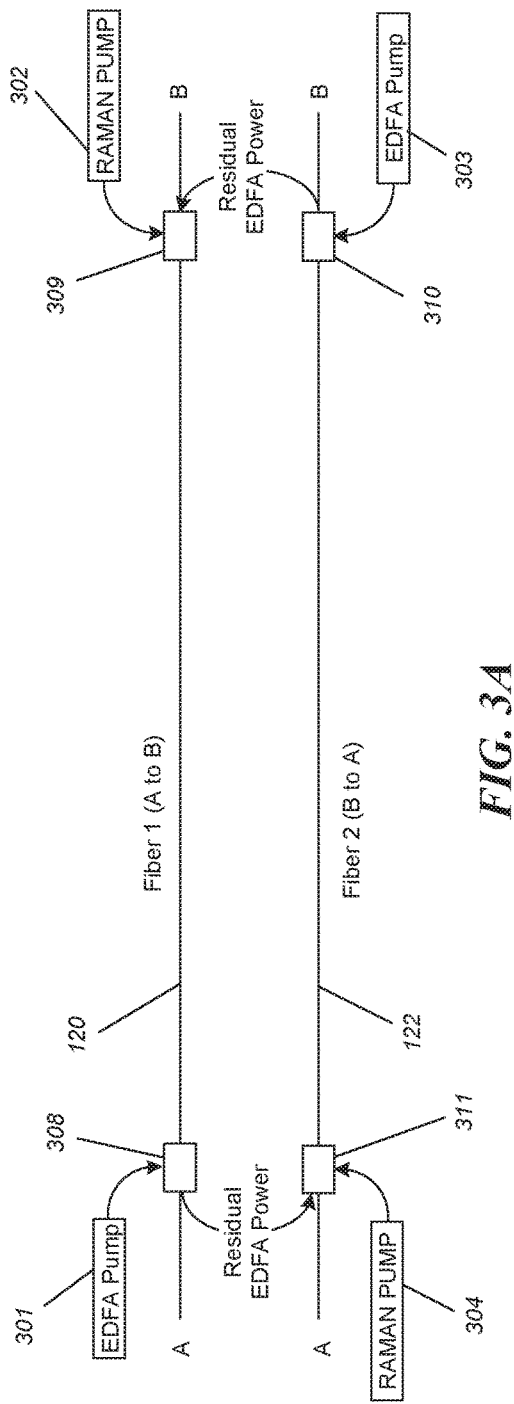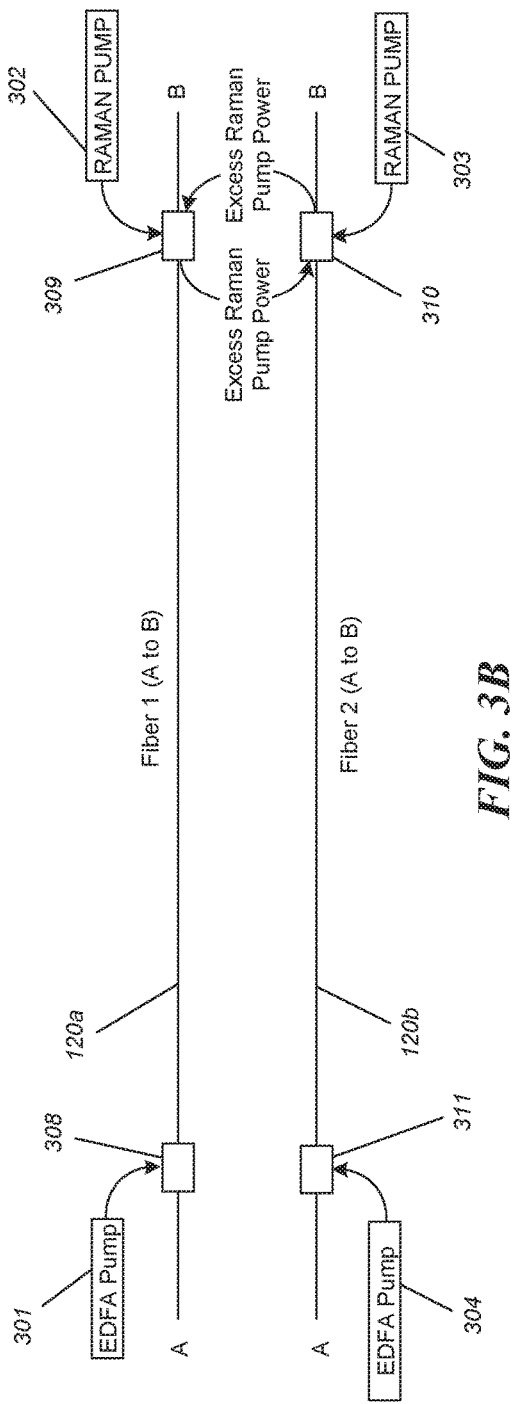

RAMAN AMPLIFIER PUMPED WITH RESIDUAL POWER IN AN OPTICAL COMMUNICATION SYSTEM

BACKGROUND

Social networking systems enable a very large number of users (e.g., a billion users or more) to share data worldwide. To support this data sharing, the social networking systems have multiple data centers that are distributed around the world. The multiple data centers enable the data to be distributed worldwide, e.g., to back up data or to store data near where the data will be consumed. Each of these data centers typically has a very large number of server computing devices. The server computing devices may be assigned various roles, e.g., compute, data storage, web site, etc.

Data centers may be built and geographically located based on various requirements and constraints. Data centers in developed countries can be large, where power and land are available. In countries where power and land are less available or there is a regulation concern, data centers may be smaller. Because larger data centers are easier to manage and provide superior scalability, they are preferred and tend to be built in a handful of locations. On the other hand, for flexibility and nimbleness, small data centers are preferred and they are built in many places wherever there are users of the social networking system. As a result, the infrastructure for a social networking systems may have various sizes of data centers that are geographically dispersed.

Content providers and, e.g., streaming video content providers, similarly build large data centers and can locate them near consumers of their content. They may also use services of content delivery networks to deliver content. These content delivery networks also have geographically dispersed data centers.

To exchange large amounts of data between data centers, the owners or operators of the data centers typically use high speed data communications links between the data centers, e.g., fiber optic communications links. High speed communications links (also referred to herein as "lines"), e.g., fiber optic links, can have two physical communications lines (e.g., fibers) that together form a circuit. One of these lines is typically used to transmit data and the other line is typically used to receive data. This is commonly known as full duplex communications.

BRIEF DESCRIPTION OF THE DRAWINGS

FIG. 3A is a block diagram illustrating aspects of optical power sharing in an optical communication network, consistent with various embodiments.

FIG. 3B is another block diagram illustrating aspects of optical power sharing in an optical communication network, consistent with various embodiments.

DETAILED DESCRIPTION

Figure 1:
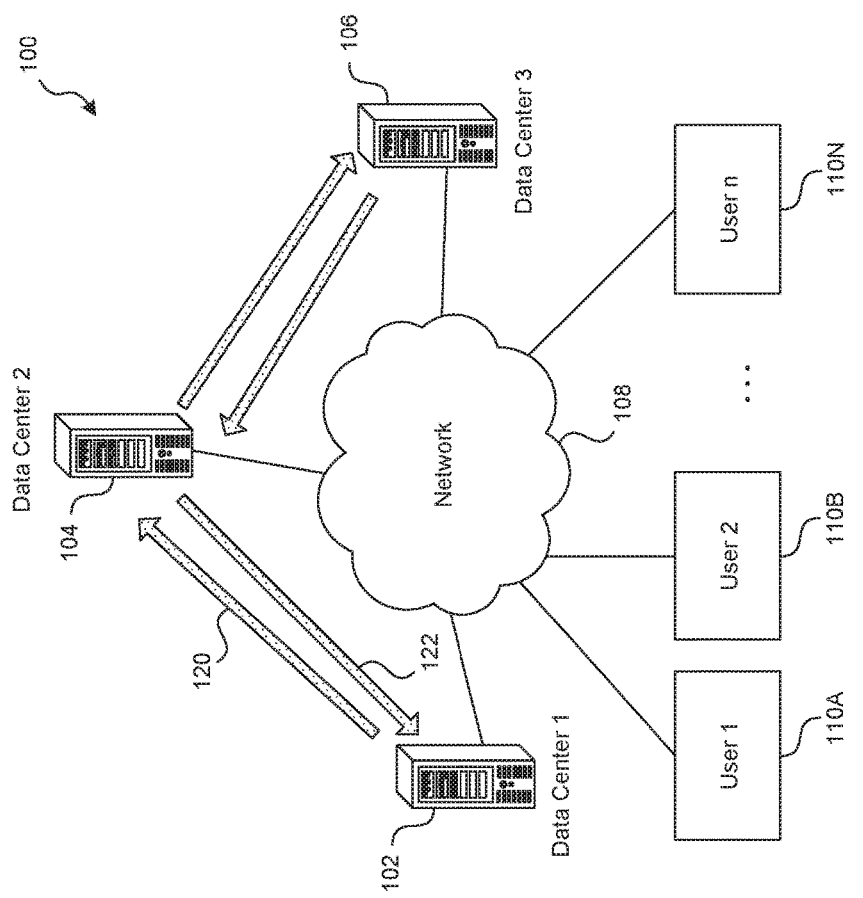
FIG. 1 is a block diagram illustrating an environment in which an optical power management and supply may be employed, consistent with various embodiments.

The disclosed techniques and systems improve and optimize the performance and utilization of communications networks, e.g., a fiber optic network, based on an architecture that uses residual power received at a downstream node of the fiber network to implement amplification of optical signals by injection the residual power in a backward direction.

In optical communications networks, e.g., fiber optic networks, a transponder can convert or generate various wavelengths of light that is propagated along a fiber optic cable. Various light wavelengths can be used to transmit or receive data. In dense wavelength division multiplexing (DWDM), which is a physical optical layer protocol for exchanging data, multiple "channels" are used to transmit or receive data in parallel on a single fiber or on two fibers ("fiber pair").

In conventional systems, each optical link is typically powered by at least one erbium-doped fiber amplifier (EDFA), which can provide amplification in the forward direction (i.e., in the direction of data flow). In its basic form, an EDFA includes a Erbium-doped fiber (typically of length 20 meters) a pump laser (e.g., 980 nm or 1480 nm) and a WDM component for combining the pump signal with the DWDM signal. This configuration can be augmented by deploying a Raman amplifier to inject power into the optical link downstream. It is readily understood that Raman amplifiers (i.e., distributed Raman amplifiers) use the transmission medium itself as the medium into which the backward Raman pump is injected to provide amplification of optical signals traversing the optical medium. An optical pump for a Raman amplifier can operate at, for example, 1455 nm, while providing amplification for signals carried in other ranges of wavelengths, such as in 1545 to 1555 nm range. In some implementations, the Raman pump operates at nominal wavelength of 1480 nm. The combination of the EDFA and the downstream Raman amplifier can operate to lower the required power that needs be launched into transmission medium by each pump and/or increase the distance at which additional amplification of the optical signal becomes necessary. In addition to the main pumps used for EDFA and Raman amplifiers, fiber communication systems further utilize redundant or auxiliary pumps to improve the reliability of the fiber communication network, for example, in the event that the main pumps fail. As such, each fiber link, or each span of the fiber link, can potentially use two EDFAs and two Raman pumps.

With proliferation of media distribution and information sharing needs amongst a variety of geographically diverse consumers and distributors, optical communications networks are being widely deployed to fulfill the ever-increasing bandwidth requirements of such communication systems. Consequently, it is important to reduce the costs associated with implementation of fiber communication networks and simplify their deployments throughout the world. The cost reduction becomes even more significant when, due to exhaustion of bandwidth capacity of optical links (e.g., a single pair of optical fibers), additional fiber links in each communication direction become necessary.

The systems and configurations that are described in detail below provide power sharing configurations that reduce the amount of optical power need for amplifying optical signals and maintaining flow of data and information in fiber optic channels.

One aspect of the disclosed technology relates to an optical communication network that includes a first node coupled to a first optical channel and to a second optical channel. The first optical channel is formed as part of a first optical fiber and the second optical channel is formed as part of a second optical fiber. The first node is configured to transmit optical signals to a second node through the first optical channel and to receive optical signals from the second node through the second optical channel. In the optical communication network, the second node is coupled to the first optical channel and to the second optical channel and is configured to receive optical signals from the first node through the first optical channel and to transmit optical signals to the first node through the second optical channel. The optical communication network further includes a first and a second optical amplifiers coupled to the first optical fiber to amplify optical signals traversing in a first direction, as well as a third and a fourth optical amplifiers coupled to the second optical fiber to amplify optical signals traversing in a second direction opposite to the first direction. In the optical communication network, the fourth optical amplifier is further coupled to the first optical fiber to receive excess optical power from the first optical.

In one example embodiment, each of the first and the third optical amplifiers is an Erbium-doped fiber amplifier (EDFA), and each of the second and the fourth optical amplifiers is a Raman amplifier. In one example embodiment, each of the first and the third optical amplifiers is configured to amplify optical signals traversing in forward direction, and each of the second and the fourth optical amplifiers is configured to amplify optical signals traversing in backward direction. In one embodiment, the optical communication network further includes a first optical coupler to direct the excess optical power to the fourth optical amplifier that is a Raman amplifier In one example embodiment, the second optical amplifier is further coupled to the second optical fiber to receive excess optical power from the second optical fiber. In such an example embodiment, the optical communication network can further include further a second optical coupler to direct the excess optical power from the second optical fiber to the second optical amplifier that is a Raman amplifier. In one example embodiment, the optical communication network is configured to operate in a wavelength range of 1530 to 1565 nm. In a further embodiment, one or both of the first node or the second node include: a user device, or a server.

Another aspect of the disclosed technology relates to an optical communication network that includes a first node coupled to a first optical channel and to a second optical channel. The first optical channel is formed as part of a first optical fiber and the second optical channel is formed as part of a second optical fiber. The optical communication network also includes a second node coupled to the first optical channel and to the second optical channel and configured to receive optical signals from the first node through both the first and the second optical channels. The optical communication network further includes a first and a second optical amplifiers coupled to the first optical fiber to amplify optical signals traversing from the first node to the second node, and a third amplifier coupled to the second optical fiber to amplify optical signals traversing from the first node to the second node. In this optical communication network, the second optical amplifier is configured to receive excess optical power from the second optical channel for amplification of signals traversing from the first node to the second node on the first optical channel.

In one example embodiment, the optical communication network described immediately above includes at least two optical pumps, where one of the optical pumps is coupled to the first optical amplifier, and another one of the pumps is coupled to the third optical amplifier. In one example embodiment, each of the first and the third optical amplifiers is an Erbium-doped fiber amplifier (EDFA), and the second optical amplifier is a Raman amplifier.

In one example embodiment, the optical communication network further includes a fourth optical amplifier coupled to the second optical fiber to amplify optical signals traversing from the first node to the second node, where the fourth optical amplifier is configured to receive excess optical power from the first optical channel for amplification of signals traversing from the first node to the second node on the second optical channel. In one example embodiment, the fourth optical amplifier is a Raman amplifier. In one example embodiment, the optical communication network is configured to operate in a wavelength range of 1530 to 1565 nm. In one example embodiment, the optical communication network further includes a computing device including one or more processors and non-transitory computer readable media for storing processor executable instructions.

Another aspect of the disclosed embodiments relates to a an optical power arrangement for use in a fiber optical communication network that includes a first and a second optical fiber configured to communicate data in opposite directions, a first optical amplifier that is coupled to the first optical fiber, a second optical amplifier that is coupled to the second optical fiber, and an optical coupler to couple excess power from the first optical fiber to the second optical amplifier that is a Raman-type amplifier.

In one example embodiment, the second optical amplifier is configured to provide amplification for signals traveling in the second optical fiber opposite to travel direction of signals in the first optical fiber. In one example embodiment, the optical power arrangement includes an additional optical coupler coupled to an additional Raman-type amplifier that is coupled to the first optical fiber. In this example embodiment, the additional optical coupler is configured to receive excess optical power from the second optical fiber and to provide power to the additional Raman-type amplifier. In one example embodiment, the additional Raman-type amplifier is configured to provide amplification for signals traveling in the first optical fiber opposite to travel direction of signals in the second optical fiber. In one example embodiment, the optical power arrangement further includes an additional EDFA coupled to the second optical fiber and configured to provide amplification for signals traveling in the second optical fiber opposite to travel direction of signals in the first optical fiber.

Environment

Turning now to the figures, FIG. 1 is a block diagram illustrating an environment 100 in which the direction-switchable transponder may operate. One or more data centers 102, 104, and 106 may be interconnected via a network 108 (e.g., the Internet). Users, e.g., users 110A, 110B, and 110N, may access data stored at the data centers. The data center may respond to the request immediately, may redirect the request to a different data center, or may download the requested data from the different data center and respond to the request. As an example, suppose User 1 110A requests content from a social networking system or a video streaming service. A server that initially receives the request may direct the request to Data Center 1 102 because that data center is geographically located closest to User 1 110A. As is known in the art, by directing user requests to data centers that are geographically located closest to them, the number of network hops can be reduced and further responses can be rapidly communicated to the users. If the requested content is not available at Data Center 1 102, request can be forwarded to a different data center that stores the content, e.g., Data Center 2 104. However, because of the additional network hops between User 1 110A and Data Center 2 104 (as compared to Data Center 1 102), the content may arrive slowly. The user may notice sluggish performance, stops in video, etc. To reduce these issues, Data Center 1 102 may employ high speed communications lines 120 and 122 to quickly download the requested content from Data Center 2 104 and then respond to the user request. The high speed communications lines 120 and 122 can be fiber optic communications lines or indeed any communications lines that offer very high bandwidth and throughput.

Figure 2:
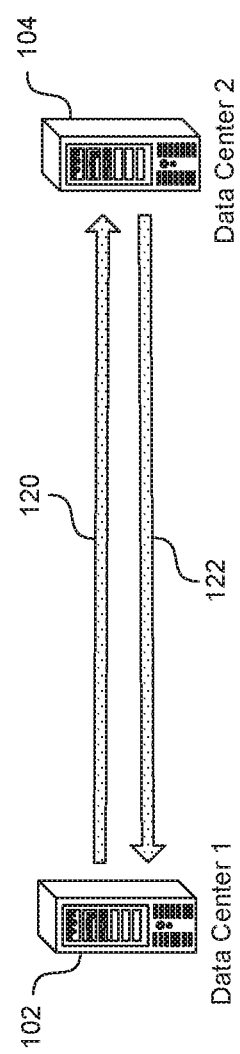
FIG. 2 is a block diagrams illustrating aspects of high speed communications lines, consistent with various embodiments.

FIG. 2 is a block diagram illustrating aspects of high speed communications lines, consistent with various embodiments. According to FIG. 2, Data Center 1 102 is communicably coupled, via high speed communications lines 120 and 122 that together form a circuit, to Data Center 2 104. In some embodiments, the high speed communications lines 120 and 122 may together be a fiber optic communications pair. While in the example block diagrams of FIGS. 1 and 2 high speed communication lines 120 and 122 are shown as connecting the depicted data centers, it is understood that high speed lines can provide connectivity among different devices, such as between data centers and users, or among users.

FIG. 3A is a block diagram illustrating aspects of optical power sharing in an optical communication network, consistent with the disclosed embodiments. FIG. 3A shows a fiber pair, identified as Fiber 1 120 and Fiber 2 122 for carrying optical signals from node A to node B, and node B to node A, respectively. Nodes A and B can, for example, represent different users, data centers, or other entities or devices in an optical communications network. An EDFA 308, powered by EDFA Pump 301, is coupled to node A to provide amplification of optical signals that traverse on Fiber 1 120 from node A to node B. In the configuration of FIG. 3A, a Raman Amplifier 309 is positioned downstream on Fiber 1 120, and is pumped by Raman Pump 302. As noted earlier, Raman amplifiers, such as Amplifier 309, can inject backwards power into the fiber channel in order to provide amplification for signals that traverse from node A to node B. FIG. 3A shows a similar configuration with respect to Fiber 2 122, which is configured for transmitting signals from node B to node A. In particular, EDFA Pump 303 provides optical power for EDFA 310 to provide amplification of optical signals traversing from node B to node A. Raman Pump 304 provides optical power to Raman Amplifier 311 to provide amplification of optical signals traversing from node B to node A.

FIG. 3A further illustrates an aspect of the disclosed embodiments related to the use of excess or residual EDFA power available at node A from EDFA pump 301 that is fed into the Raman Amplifier 311 of Fiber 2 122. Similarly, excess or residual EDFA power available from signals at node B can be coupled to the Raman Amplifier 309 of Fiber 1 120. The excess power can for example be coupled to the Raman Amplifiers 304, 309 via couplers that couple two fibers together and transfer any excess power between the fibers.

FIG. 3B is another block diagram illustrating aspects of optical power sharing in an optical communication network, consistent with the disclosed embodiments. FIG. 3B shows two fibers, identified as Fiber 1 120a and Fiber 2 120b for carrying optical signals from node A to node B. Nodes A and B can, for example, represent different users, data centers, or other entities or devices in an optical communications network. An EDFA 308, powered by EDFA Pump 301, is coupled to node A to provide amplification of optical signals that traverse on Fiber 1 120 from node A to node B. In the configuration of FIG. 3, a Raman Amplifier 309 is positioned downstream from the EDFA 301, and is pumped by Raman Pump 302. As noted earlier, Raman amplifiers, such as Amplifier 309, can inject backwards power into the fiber channel in order to provide amplification for signals that traverse from node A to node B. FIG. 3B shows a similar configuration with respect to Fiber 2 120b, which is also configured for transmitting signals from node A to node B. In particular, EDFA Pump 304 provides optical power for EDFA 311 to provide amplification of optical signals traversing from node A to node B. Raman Pump 303 provides optical power to Raman Amplifier 310 to provide amplification of optical signals traversing from node A to node B.

FIG. 3B further illustrates the use of excess or residual power to pump the Raman amplifier for amplification of optical signals in a shared configuration. For example, at node B, the residual power from Fiber 1 120a signals is used to pump the Raman amplifier 310 that is configured to amplify signals traversing from node A to node B on Fiber 2 120b. Similarly, residual power from optical signals on Fiber 2 120b is used to pump the Raman amplifier 309 that is configured to amplify signals traversing from node A to node B on Fiber 1 120a. It should be noted that FIG. 3B shows an example in which signals travel from node A to node B. It is understood, however, that in a typical scenario where each fiber rail includes a pair of fibers configured to allow bidirectional communications, the disclosed residual power utilization techniques can be applied to fiber channels in both directions. Moreover, while the configurations of FIGS. 3A and 3B only depict two fiber channels, it is readily understood that the disclosed power sharing techniques can be implemented in systems and networks that include additional optical channels.

The example embodiments that are illustrated in FIGS. 3A and 3B demonstrate that the use of excess or residual power can be advantageously used to effectuate power savings in a fiber optics communication network. The amount of excess optical power depends on many factors such as the amount of initial power launched into the fiber channel, losses in the fiber channel, or the required quality of service for transmitted signals. In some example implementations, the residual power from the fiber channel can be in the range of 40 to 50 mW, which may not be sufficient by itself for operating a Raman amplifier. In such implementations, the excess power may be used as an auxiliary power source to augment other sources in the communication network. Additionally, or alternatively, excess power from multiple fiber channels may be used to cumulatively operate the amplifier.

In one example, the disclosed technology is implemented in the telecommunication C-band that spans the 1530-1565 nm range of wavelengths.

Figure 4:
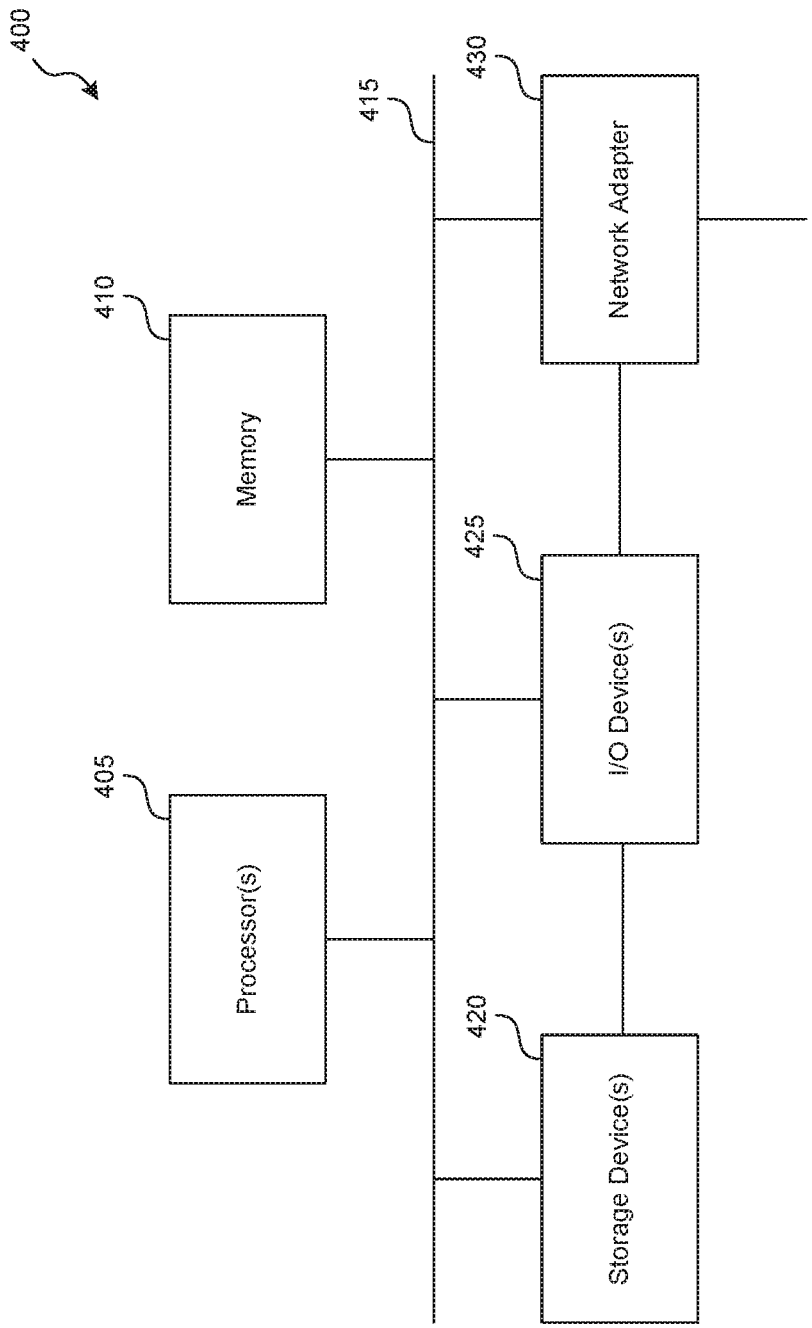
FIG. 4 is a block diagram of a computing device, consistent with various embodiments.

Operations and management of the disclosed components, including the pumps and amplifiers can be implemented under the control of one or more computing devices. FIG. 4 is a block diagram of a such computing system, consistent with various embodiments. The computing system 400 may include one or more central processing units ("processors") 405, memory 410, input/output devices 425 (e.g., keyboard and pointing devices, display devices), storage devices 420 (e.g., disk drives), and network adapters 430 (e.g., network interfaces) that are connected to an interconnect 415. The interconnect 415 is illustrated as an abstraction that represents any one or more separate physical buses, point to point connections, or both connected by appropriate bridges, adapters, or controllers. The interconnect 415, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 410 and storage devices 420 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 410 can be implemented as software and/or firmware to program the processor(s) 405 to carry out actions described above. In some embodiments, such software or firmware may be initially provided to the processing system 400 by downloading it from a remote system through the computing system 400 (e.g., via network adapter 430).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. An optical communication network, comprising:
   a first node coupled to a first optical channel and to a second optical channel, the first optical channel formed as part of a first optical fiber and the second optical channel formed as part of a second optical fiber, the first node configured to transmit optical signals to a second node through the first optical channel and to receive optical signals from the second node through the second optical channel;
   the second node coupled to the first optical channel and to the second optical channel and configured to receive optical signals from the first node through the first optical channel and to transmit optical signals to the first node through the second optical channel;
   a first and a second optical amplifiers coupled to the first optical fiber to amplify optical signals traversing in a first direction; and
   a third and a fourth optical amplifiers coupled to the second optical fiber to amplify optical signals traversing in a second direction opposite to the first direction, wherein the fourth optical amplifier is further coupled to the first optical fiber to receive at the first node, excess optical power in the first node;
   wherein the second optical amplifier is coupled to the second optical fiber to receive at the second node, excess optical power in the second node.

2. The optical communication network of claim 1, wherein:
   each of the first and the third optical amplifiers is an Erbium-doped fiber amplifier (EDFA); and
   each of the second and the fourth optical amplifiers is a Raman amplifier.

3. The optical communication network of claim 1, wherein:

each of the first and the third optical amplifiers is configured to amplify optical signals traversing in forward direction; and each of the second and the fourth optical amplifiers is configured to amplify optical signals traversing in backward direction.

4. The optical communication network of claim 1, further including a first optical coupler to direct the excess optical power to the fourth optical amplifier that is a Raman amplifier.

5. The optical communication network of claim 1, wherein the first node includes a first EDFA pump and the second node includes a second EDFA pump.

6. The optical communication network of claim 5, further including a second optical coupler to direct the excess optical power from the second optical fiber to the second optical amplifier that is a Raman amplifier.

7. The optical communication network of claim 1, configured to operate in a wavelength range of 1530 to 1565 nm.

8. The optical communication network of claim 1, wherein one or both of the first node or the second node include:
   a user device, or
   a server.

9. An optical power arrangement for use in a fiber optical communication network, comprising:
   a first and a second optical fiber configured to communicate data in opposite directions;
   a first optical amplifier that is coupled to the first optical fiber;
   a second optical amplifier that is coupled to the second optical fiber; and
   an optical coupler to couple at a first node, excess power in the first node to the second optical amplifier that is a Raman-type amplifier.

10. The optical power arrangement of claim 9, wherein the second optical amplifier is configured to provide amplification for signals traveling in the second optical fiber opposite to travel direction of signals in the first optical fiber.

11. The optical power arrangement of claim 9, further comprising:
   an additional optical coupler coupled to an additional Raman-type amplifier that is coupled to the first optical fiber, the additional optical coupler configured to receive at a second node, excess optical power in the second node and to provide power to the additional Raman-type amplifier.

12. The optical power arrangement of claim 11, wherein the additional Raman-type amplifier is configured to provide amplification for signals traveling in the first optical fiber opposite to travel direction of signals in the second optical fiber.

13. The optical power arrangement of claim 9, further comprising an Erbium-doped fiber amplifier (EDFA) coupled to the second optical fiber and configured to provide amplification for signals traveling in the second optical fiber opposite to travel direction of signals in the first optical fiber.

* * * * *